(12) United States Patent
Kaplan et al.

(10) Patent No.: US 8,601,814 B2
(45) Date of Patent: Dec. 10, 2013

(54) GEOTHERMAL BINARY CYCLE POWER PLANT WITH GEOTHERMAL STEAM CONDENSATE RECOVERY SYSTEM

(75) Inventors: Uri Kaplan, Doar Na Emek Soreq (IL); Dany Batscha, Kiriat Ono (IL); Shai Raveh, Moshav Meishar (IL)

(73) Assignee: Ormat Technologies Inc., Reno, NV (US)

( * ) Notice: Subject to any disclaimer, the term of this patent is extended or adjusted under 35 U.S.C. 154(b) by 203 days.

(21) Appl. No.: 13/088,901

(22) Filed: Apr. 18, 2011

(65) Prior Publication Data

US 2012/0260655 A1    Oct. 18, 2012

(51) Int. Cl.
*F03G 4/00*    (2006.01)

(52) U.S. Cl.
USPC ...................................................... 60/641.2

(58) Field of Classification Search
USPC ......... 60/651, 657, 649, 641.5; 415/112, 230; 322/24
See application file for complete search history.

(56) References Cited

U.S. PATENT DOCUMENTS

| | | | | |
|---|---|---|---|---|
| 4,029,142 A | * | 6/1977 | Van Beukering | 165/104.26 |
| 4,896,498 A | * | 1/1990 | Knizia | 60/773 |
| 5,497,624 A | * | 3/1996 | Amir et al. | 60/641.5 |
| 5,664,419 A | * | 9/1997 | Kaplan | 60/641.2 |
| 5,809,782 A | * | 9/1998 | Bronicki et al. | 60/641.2 |
| 6,298,663 B1 | * | 10/2001 | Bronicki et al. | 60/641.2 |
| 7,775,045 B2 | | 8/2010 | Kaplan et al. | |
| 7,797,940 B2 | | 9/2010 | Kaplan | |
| 2006/0112693 A1 | * | 6/2006 | Sundel | 60/670 |
| 2007/0095065 A1 | * | 5/2007 | Kaplan et al. | 60/651 |
| 2009/0320473 A1 | * | 12/2009 | Krieger et al. | 60/641.2 |
| 2010/0313565 A1 | | 12/2010 | Kaplan et al. | |
| 2011/0115445 A1 | * | 5/2011 | Bronicki et al. | 322/24 |

* cited by examiner

*Primary Examiner* — Thomas Denion
*Assistant Examiner* — Shafiq Mian
(74) *Attorney, Agent, or Firm* — Oblon, Spivak, McClelland, Maier & Neustadt, L.L.P.

(57) ABSTRACT

A geothermal based, binary cycle power plant is provided, comprising: a vaporizer for vaporizing pre-heated organic motive fluid by means of geothermal steam; two organic vapor turbines operating in parallel and coupled to a common generator, each of said turbines being driven by vaporized organic motive fluid supplied to each turbine; two recuperators for heating the organic motive fluid by means of a corresponding organic vapor turbine discharge; and two condensers for condensing heat depleted motive fluid exiting said two recuperators, respectively.

Figure 1:
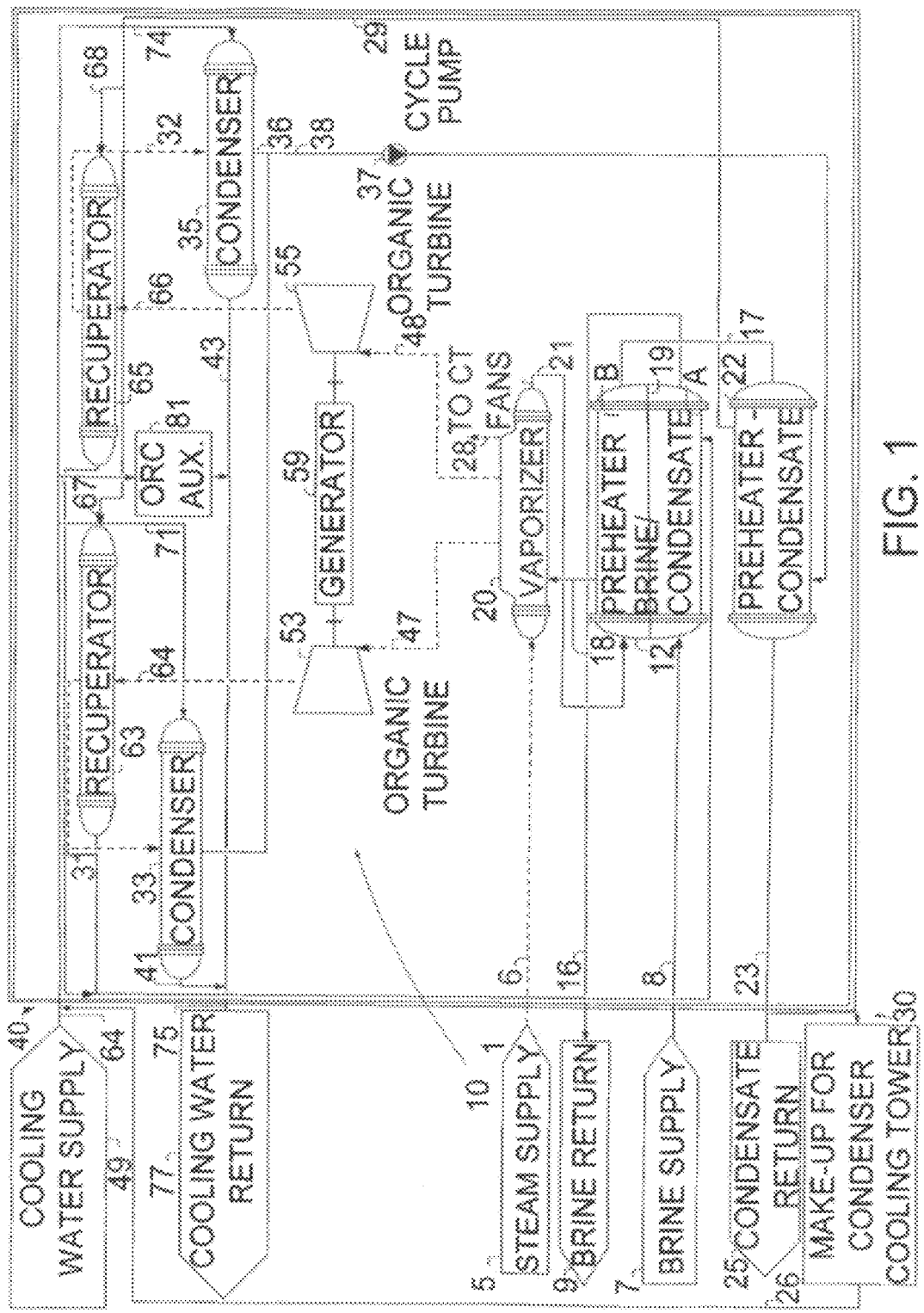

A geothermal steam condensate recovery system is also provided, comprising a source of geothermal steam for vaporizing a organic motive fluid and producing geothermal steam condensate, and conduit means through which geothermal steam condensate is delivered to a supply of cooling liquid used to condense the organic motive fluid, the delivered geothermal steam condensate serving as make-up liquid for evaporated cooling liquid.

11 Claims, 2 Drawing Sheets

GEOTHERMAL BINARY CYCLE POWER PLANT WITH GEOTHERMAL STEAM CONDENSATE RECOVERY SYSTEM

FIELD

The present invention relates to the field of geothermal energy. More particularly, the invention relates to a geothermal binary cycle power plant with a system for utilizing geothermal steam condensate.

BACKGROUND

At many prior art geothermal based power plants, geothermal fluid exiting production wells is separated into a steam portion and a brine portion. In binary power plant cycles, the steam portion can be used to provide latent heat in a vaporizer for producing organic motive fluid vapor while the geothermal steam condensate produced, together with the brine may be brought in heat exchanger relation with the motive fluid of a binary power cycle, e.g. organic motive fluid, for preheating the motive fluid. The organic motive fluid vapor produced can be supplied to an organic vapor turbine for producing electricity.

U.S. Pat. No. 5,664,419 describes an apparatus that comprises a recuperator for transferring heat from heat depleted organic fluid produced by an organic vapor turbine to organic condensate produced by an organic vapor condenser. The heated organic condensate produced by the recuperator is supplied to a pre-heater which receives brine and steam condensate from the vaporizer for transferring sensible heat to the organic fluid before the brine and steam condensate are disposed of while cooled organic vapor produced by the recuperator is supplied to the organic vapor condenser. The combined flow of cooled brine and cooled steam condensate forms a combined flow of diluted, cooled brine for re-injection into a re-injection well. Thus, in U.S. Pat. No. 5,664,419, the presence of the recuperator permits additional heat to be used by the organic working fluid in excess of that transferred directly by the geothermal fluid in the vaporizer and the preheater, without increasing the vaporization temperature of the organic fluid. Thus, the exit temperature of the brine leaving the preheater is no longer the controlling factor for establishing the amount of heat that can be added to the working fluid.

The present invention provides a geothermal steam condensate recovery system for utilizing the steam condensate in a way that it has not been exploited heretofore.

In addition, the present invention provides a geothermal fluid recovery system for utilizing the brine in a way that it has not been exploited heretofore.

Other advantages of the invention will become apparent as the description proceeds.

SUMMARY

The present invention is directed to a geothermal based, binary cycle power plant, comprising a vaporizer for vaporizing pre-heated organic motive fluid by means of geothermal steam; two organic vapor turbines operating in parallel and which can be coupled to a common generator, each of said turbines being driven by vaporized organic motive fluid supplied to each turbine; two recuperators for heating the organic motive fluid by means of a corresponding organic vapor turbine discharge; and two condensers for condensing heat depleted organic motive fluid exiting said two recuperators, respectively.

By using two recuperators wherein, in one aspect, the combined liquid output of the recuperators is used for pre-heating the organic motive fluid and wherein, another aspect, one recuperator supplies the preheated organic motive fluid condensate output to a pre-heater, this recuperator being supplied with the organic motive fluid condensate output from the other recuperator, high power efficiency levels and power output are achieved. In addition, thereby, less heat can be extracted from the geothermal brine so that the power plant of the present invention is less sensitive to separation or precipitation of solids from the geothermal liquid or brine and permits optimal and sustainable utilization of a geothermal resource. Moreover, in accordance with the present invention wherein the geothermal liquid or brine and geothermal steam and condensate are maintained separate from one another, the temperature of the geothermal steam condensate can be made sufficiently cool for making it suitable for use as make-up liquid for cooling liquid supplied to the cooling tower or other suitable uses such as industrial uses e.g. providing cooling liquid for evaporative cooling of air-cooled condensers or cooling liquid for fogging or deluge of the cooling pipes of air-cooled condensers, etc.

In one aspect, the organic motive fluid is preheated by means of geothermal fluid, i.e. brine or heat depleted geothermal steam or steam condensate exiting the vaporizer in pre-heaters. In addition, in a further aspect, organic motive fluid exiting the condensers is additionally pre-heated in a further pre-heater utilizing heat in further heat depleted geothermal steam or steam condensate exiting a pre-heater.

In one aspect, the power plant further comprises a further vaporizer for vaporizing pre-heated organic motive fluid by means of geothermal steam.

In one aspect, the vaporizer is supplied with pre-heated organic motive fluid pre-heated in a pre-heater by geothermal liquid or brine and the further vaporizer is supplied with pre-heated organic motive fluid pre-heated in a further pre-heater by geothermal steam or steam condensate exiting the further vaporizer.

In one aspect, the pre-heater is supplied with organic motive fluid condensate exiting one of the two recuperators, said one of the two recuperators being supplied with organic motive fluid condensate exiting the other recuperator.

By use of the pre-heaters as well as the recuperators in the power plant in accordance with an aspect of the present invention, high power plant efficiency levels are achieved as well as increased power output levels.

The present invention also provides a geothermal steam condensate recovery system, comprising a source of geothermal steam for vaporizing an organic motive fluid, and conduit means through which geothermal steam condensate is delivered to a supply of cooling liquid used to condense said organic motive fluid, said delivered geothermal steam condensate serving as make-up liquid for evaporated cooling liquid.

The system further comprises a vaporizer for vaporizing organic motive fluid by means of the geothermal steam, and a first pre-heater for pre-heating organic motive fluid condensate by means of geothermal steam or condensate, wherein the conduit means through which the geothermal steam condensate is delivered to the supply of cooling liquid supplies heat depleted geothermal steam condensate from said first pre-heater.

In one aspect, the organic motive fluid condensate pre-heated by the first pre-heater is deliverable to the vaporizer.

In one aspect, the organic motive fluid condensate pre-heated by the first preheater is heated by geothermal steam exiting the vaporizer.

In one aspect, the organic motive fluid condensate preheated by the first preheater is heated by geothermal steam or steam condensate exiting each of two vaporizers and combined by a common conduit supplying the geothermal steam or steam condensate to the first preheater.

In one aspect, the system further comprises a further preheater heat exchanger means for pre-heating preheated organic motive fluid with geothermal steam or steam condensate exiting the first pre-heater.

In one aspect, the organic motive fluid condensate preheated by the first preheater is pre-heated by the geothermal steam or steam condensate exiting the first pre-heater.

In one aspect, the first pre-heater includes a pre-heater heat exchanger means having two stages, the pre-heater heat exchanger means comprising a first stage which is a second pre-heater for pre-heating organic motive fluid by means of the geothermal liquid or brine, and a further pre-heater stage for also pre-heating organic motive fluid with geothermal steam or steam condensate exiting the vaporizer.

In one aspect, heat depleted brine which is not mixed with the heat depleted geothermal steam or steam condensate is reinjected into a reinjection well.

In one aspect, the first and further stages of pre-heater heat exchanger means are separated by a partition.

In one aspect, the temperature of the heat depleted geothermal brine exiting the pre-heater heat exchanger means is greater than its precipitation point.

In one aspect, the organic motive fluid is organic fluid of an Organic Rankine Cycle (ORC) type power system.

In one aspect, the supply of cooling liquid is cooled by means of a cooling tower.

In one aspect, the geothermal steam condensate which is not delivered to the supply of cooling liquid is re-injected into a re-injection well.

In one aspect, extracted geothermal fluid is separated into a steam portion and into a brine portion by means of a separator.

BRIEF DESCRIPTION

Figure 2:
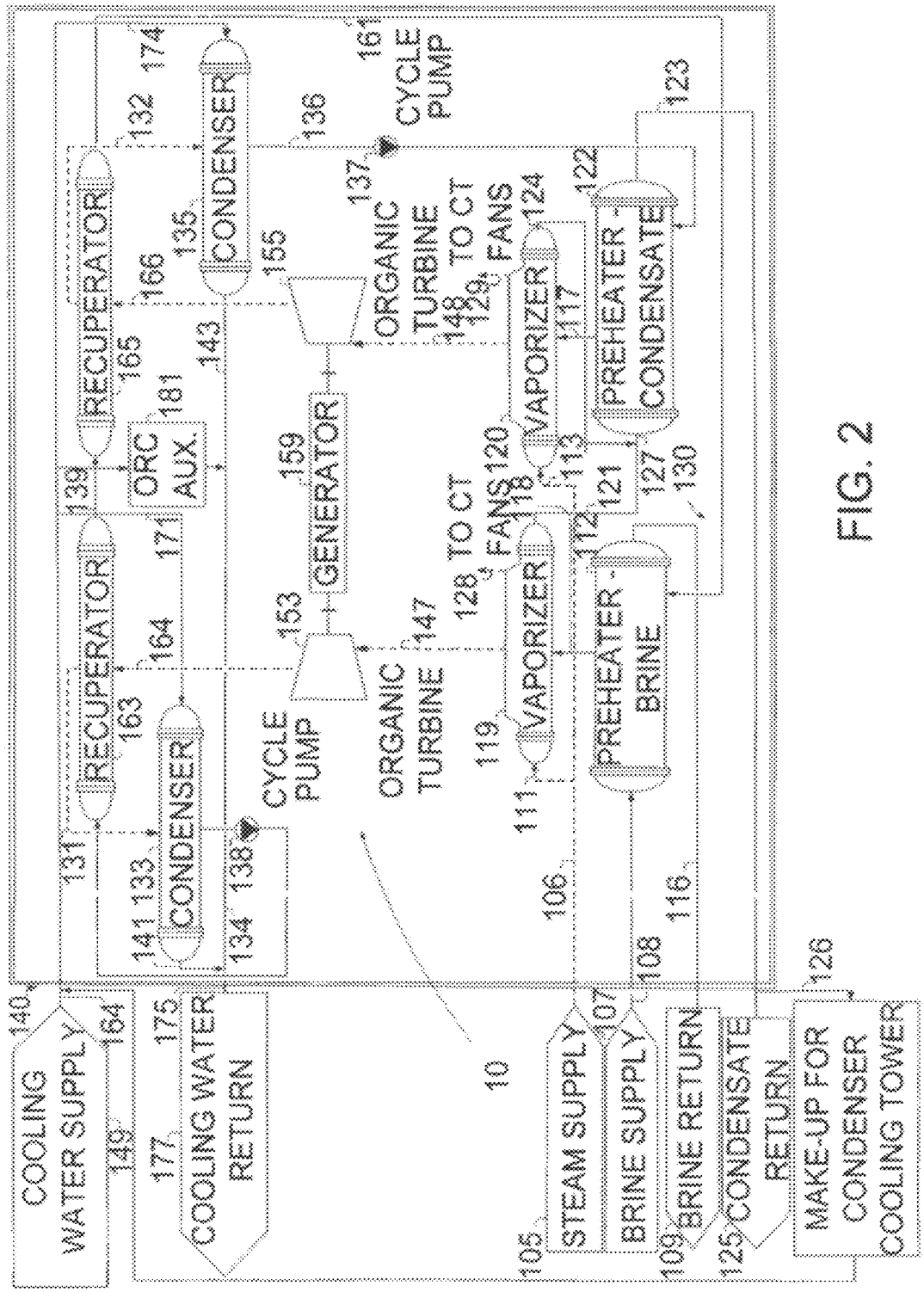

In the drawings:

FIG. 1 is a schematic illustration of a binary cycle power plant comprising a geothermal steam condensate recovery system, according to one embodiment of the present invention; and FIG. 2 is a schematic illustration of a binary cycle power plant comprising a geothermal steam condensate recovery system, according to another embodiment of the present invention.

Similar reference numerals and symbols refer to similar components.

DETAILED DESCRIPTION

FIG. 1 illustrates a geothermal based, binary cycle power plant according to one embodiment of the present invention, and is designated 40. Power plant 40 comprises Organic Rankine Cycle (ORC) type power system 10 and geothermal steam condensate recovery (SCr) system 30 operable in conjunction with ORC system 10. The dashed lines indicate conduits or lines through which fluid in a vapor phase flows, and the solid lines indicate conduits or lines through which a substantially liquid fluid flows.

In SCr system 30, a separator (not shown) separates the geothermal fluid exiting a production well at a temperature of about 120-190° C. into a steam portion and a liquid or brine portion. The steam portion is delivered via outlet 5 of the separator and conduit or line 6 to vaporizer 20, for vaporizing organic motive fluid of an organic motive fluid power cycle. The heat depleted geothermal steam or condensate exiting vaporizer 20 flows through conduit or line 21, and is heated within two-stage pre-heater heat exchanger 12 by means of the brine portion delivered thereto from outlet 7 of the separator via conduit or line 8. In first stage A of pre-heater heat exchanger 12, which may be of the shell and tube type, the separated brine portion preheats the organic motive fluid recuperator discharge supplied through conduit 61. In stage B of pre-heater heat exchanger 12, heat depleted geothermal steam or condensate also provides heat for further pre-heating the organic motive fluid condensate. The second stage B of pre-heater heat exchanger 12, wherein a portion, or all, of the heat depleted geothermal steam or condensate transfers heat to the organic motive fluid in addition to the brine in first stage A, may be separated from first stage A by partition 19 through which the brine passes. Heat depleted brine which is not mixed with heat depleted geothermal steam or condensate exits pre-heater heat exchanger 12 via conduit 16 and is re-injected into a reinjection well via inlet 9.

Heat depleted geothermal steam condensate exits second stage B of pre-heater heat exchanger 12 via conduit or line 17 and is delivered to additional pre-heater 22, which also preheats the organic motive fluid condensate supplied thereto. By employing pre-heater 22, further heat present in geothermal condensate is transferred to the organic motive fluid supplied to additional pre-heater 22 and therefore the rate of heat transfer for preheating the organic motive fluid condensate will also be increased.

An additional advantage of the aspect of the present embodiment is that the heat depleted geothermal steam condensate thus having a reduced temperature may be exploited to provide make-up water for the cooling tower water supply 49, or for any other suitable use by means of which the organic motive fluid condensate is heated. Such uses could include such industrial uses e.g. providing cooling liquid for evaporative cooling of air-cooed condensers or cooling liquid for fogging or deluge of the cooling pipes of air-cooled condensers, etc. Some of the geothermal steam condensate exiting additional pre-heater 22 via conduit or line 23 is diverted to conduit 26, from which the geothermal steam condensate is delivered to main cooling liquid supply conduit 64 extending from cooling liquid supply 49, to serve as make-up water for the cooling liquid that was evaporated. The remaining portion of the geothermal steam condensate is re-injected into a re-injection well via supply 25.

While prior art power plants require a source of make-up cooling liquid, which significantly adds to the operating costs of the plant, the heretofore unexploited geothermal steam condensate resource normally reinjected into a re-injection well can provide much benefits to the power plant in terms of assisting in condensing the organic motive fluid, obviating the need of make-up cooling liquid, and preheating the condensed organic motive fluid.

The operating conditions of power plant 40, particularly of each organic fluid condenser and of pre-heater heat exchanger means 12, may be suitably selected to ensure that the temperature of the geothermal liquid or brine exiting pre-heater heat exchanger means 12 will be greater than its precipitation point. Maintaining the geothermal liquid or brine above its precipitation point will prevent undesired corrosion and scaling onto the metallic conduit and heat exchanger surfaces of significant quantities of silica, chlorides, and carbonates that are typically dissolved in the geothermal liquid.

In ORC system 10, the discharge from two organic turbines 53 and 55 operating in parallel and advantageously coupled to a common generator 59 is delivered to recuperators 63 and 65, respectively, via conduits 64 and 66, respectively. The heat depleted organic fluid vapor exiting recuperators 63 and 65 is delivered to condensers 33 and 35, respectively, via conduits 31 and 32, respectively. Organic condensate is produced by providing cooling liquid, which is supplied through conduits or lines 71 and 74 branching from main cooling liquid supply conduit or line 64, to condensers 33 and 35, respectively. The heated cooling liquid exits condensers 33 and 35 via conduits 41 and 43, respectively, leading to the cooling liquid conduit 75 which extends to return inlet 77 of the cooling tower. Electric generator 59 and other rotating components included in power plant 40 may be cooled by means of auxiliary cooling supply 81, which receives cooling liquid from main cooling liquid supply conduit 64 and discharges heated cooling liquid to conduit 75.

The organic motive fluid condensate discharged from organic motive fluid condensers 33 and 35 through conduits 34 and 36, respectively, is directed to common conduit 38, pressurized by organic motive fluid condensate pump 37, and delivered to preheater 22. The preheated organic motive fluid condensate flows through conduit 29 and then branches into conduits 67 and 68 extending to recuperators 63 and 65, respectively. The enthalpy of the preheated organic motive fluid condensate is increased by means of the corresponding organic motive fluid vapor turbine discharge delivered to recuperators 63 and 65, and is further increased, after flowing through conduits 51, 52, and 61, by means of the brine flowing through first stage A of pre-heater heat exchanger 12 and also steam condensate flowing through further stage B of pre-heater heat exchanger 12. The heated organic motive fluid is then delivered via conduit 18 from first stage A of heat exchanger 12 to vaporizer 20. In vaporizer 20, the organic motive fluid is vaporized by the geothermal steam portion, and is delivered via conduits or lines 47 and 48 to organic motive fluid vapor turbines 53 and 55, respectively. Non-condensable gases (NCG) if produced can be bled off via conduit 28 to drive the cooling tower fans.

The heat influx transferred to the organic fluid by the brine in two stages, i.e. by geothermal liquid or brine in first stage A and by the steam condensate in further stage B of pre-heater heat exchanger 12 as well as in pre-heater 22, sufficiently heats the organic fluid such that the heat capacity of the geothermal steam can be utilized to generate enough vapor to drive two turbines operating in parallel. The discharge of each of the two turbines operating in parallel is also utilized to further add to the heat influx provided to the organic fluid by means of recuperators 63 and 65. Furthermore, by using steam condensate in 2 pre-heaters, the steam condensate is cooled sufficiently to make it suitable for use as make-up water for the cooling liquid in the cooling tower.

While one geothermal based, binary cycle power plant 40 is described above in this embodiment, advantageously, in accordance with this embodiment of the present invention, a plurality of such binary cycle power plants can be used.

FIG. 2 illustrates another embodiment of the invention wherein geothermal based, binary cycle power plant 140 also comprises an ORC system 110 provided with two turbines 153 and 155 operating in parallel and a SCr system 130 operable in conjunction with ORC system 110; however, in this embodiment, two vaporizers 119 and 120 are employed to supply organic motive fluid vapor to organic vapor turbines 153 and 155, respectively, and two recuperators 163 and 165 supply organic fluid in series exiting recuperator 165.

In SCr system 130, a separator (not shown) separates the geothermal fluid from a production well into a steam portion and a liquid or brine portion. The separated steam portion flows via outlet 105 of the separator and conduit or line 106, the latter branching into conduits or lines 111 and 113 through which the steam is delivered to vaporizers 119 and 120, respectively, for producing organic fluid vapor. The flow of heat depleted geothermal steam or steam condensate exiting vaporizers 119 and 120 via conduits or lines 121 and 124, respectively, is combined and the combined flow of heat depleted geothermal steam or steam condensate is supplied through conduit or line 127 to steam condensate pre-heater 122, for transferring the heat present in both heat depleted geothermal steam or steam condensate flows in conduits or lines 121 and 124, respectively, for pre-heating the organic motive fluid condensate delivered from organic condenser 135 by means of pump 137 via conduit 136 and thereby cooling the heat depleted geothermal steam or steam condensate.

The cooled geothermal steam condensate is also exploited to provide make-up water for cooling liquid or water supplied to cooling tower 149 or for any other suitable use such as industrial uses e.g. providing cooling liquid for evaporative cooling of air-cooled condensers or cooling liquid for fogging or deluge of the cooling pipes of air-cooled condensers, etc. Some of the geothermal steam condensate exiting pre-heater 122 via conduit 123 can be diverted to conduit 126, from which the geothermal steam condensate is delivered to main cooling liquid supply conduit 164 extending from cooling liquid supply 149, to serve as make-up water for the cooling liquid that was evaporated. The remaining portion of the geothermal steam condensate can be re-injected into a re-injection well via inlet 125.

The geothermal liquid or brine portion is supplied via outlet 107 of the separator and conduit or line 108 to brine pre-heater 112, for preheating the organic motive fluid exiting recuperator 165. The heat depleted geothermal liquid or brine flows through conduit or line 116 and is reinjected into re-injection well via inlet 109.

In ORC system 110, the discharge from the two organic vapor turbines 153 and 155 operating in parallel and advantageously coupled to a common generator 159 is delivered to recuperators 163 and 165, respectively, via conduits or lines 164 and 166, respectively. The heat depleted organic motive fluid exiting recuperators 163 and 165 is delivered to condensers 133 and 135, respectively, via conduits or lines 131 and 132, respectively, and is condensed by means of the cooling liquid flowing through conduits 171 and 174, respectively. The heated cooling liquid exits condensers 133 and 135 via conduits or lines 141 and 143, respectively, and supplied via cooling liquid conduit 175 to return inlet 177 of the cooling tower. Auxiliary cooling supply 181 receives cooling liquid from main cooling liquid supply conduit 164 and discharges heated cooling liquid to conduit 175.

The organic condensate discharged from organic motive fluid condenser 133 by means of pump 138 via conduit 134 is delivered to recuperator 163. After being heated by the discharge of organic vapor turbine 153 in recuperator 163, the heated organic motive fluid condensate flows through conduit 139 and is additionally heated by means of the discharge of organic vapor turbine 155 in recuperator 165. The heated organic motive fluid condensate is then supplied from the outlet of recuperator 165 via conduit 161 to geothermal liquid or brine pre-heater 112, from which the pre-heated organic motive fluid is supplied to vaporizer 119 via conduit 118. The vaporized organic motive fluid is supplied to organic vapor turbine 153 via conduit or line 147. Thus, due to the heat supplied to the organic motive fluid in recuperator 163 as well as in recuperator 165, less heat can be extracted from the geothermal liquid or brine in pre-heater 112, consequently allowing the temperature of the geothermal liquid or brine to be maintained above a temperature where precipitation or separation of solids from the geothermal liquid or brine.

The organic motive fluid condensate discharged from organic motive fluid condenser 135 via conduit 136 is supplied to steam condensate pre-heater 122 using pump 137. The pre-heated organic motive fluid produced therein is supplied via conduit or line 117 to vaporizer 120, after which the vaporized organic motive fluid is supplied to organic vapor turbine 155 via conduit 148. Non condensable gases produced from the geothermal steam in vaporizers 119 and 120 is bled off via conduits 128 and 129, respectively, to using the cooling tower fans.

While one geothermal based, binary cycle power plant 140 is described above in this embodiment, advantageously, in accordance with this embodiment of the present invention, a plurality of such binary cycle power plants can be used.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A geothermal based, binary cycle power plant, comprising:
    a preheater connected to receive geothermal liquid or brine for preheating an organic motive fluid;
    a first vaporizer connected to receive geothermal steam for vaporizing organic motive fluid pre-heated in the pre-heater;
    a second vaporizer connected to receive geothermal steam for vaporizing organic motive fluid;
    first and second organic vapor turbines operating in parallel and coupled to a common generator, each of said turbines being connected to receive the vaporized organic motive fluid from a respective one of said first and second vaporizers, to drive each turbine;
    first and second recuperators connected to receive heat depleted organic fluid vapor respectively exiting the first and second organic vapor turbines, for heating organic motive fluid condensate; and
    first and second condensers for condensing the heat depleted organic motive fluid exiting said first and second recuperators, respectively, to provide the organic motive fluid condensate,
    wherein said second recuperator is connected to receive organic motive fluid condensate exiting the first recuperator, and
    wherein the preheater is connected to receive the organic motive fluid condensate from the second recuperator, to be preheated therein.

2. The power plant according to claim 1, further comprising a further preheater connected to receive steam condensate from said first and second vaporizers, to preheat the organic motive fluid supplied to said second vaporizer.

3. The power plant according to claim 1, wherein heat depleted brine from the preheater is reinjected into a reinjection well.

4. A geothermal based, binary cycle power plant, comprising:
    a) a vaporizer for vaporizing pre-heated organic motive fluid by means of geothermal steam;
    b) two organic vapor turbines operating in parallel and coupled to a common generator, each of said turbines being driven by vaporized organic motive fluid supplied to each turbine;
    c) two recuperators for heating the organic motive fluid by means of a corresponding organic vapor turbine discharge;
    d) two condensers for condensing heat depleted organic motive fluid exiting said two recuperators, respectively;
    e) a preheater in which the organic motive fluid is preheated by means of heat depleted geothermal steam or steam condensate exiting the vaporizer; and
    f) a further pre-heater for pre-heating organic motive fluid exiting said condensers and utilizing heat present in further heat depleted geothermal steam or steam condensate exiting said pre-heater,
    wherein the preheated organic motive fluid exiting the further pre-heater is supplied is to said recuperators.

5. The power plant according to claim 4 wherein heated organic motive fluid condensate exiting said recuperators is combined and the combined flow is supplied to said preheater.

6. The power plant according to claim 5, wherein geothermal liquid is also supplied to a separate portion of said preheater.

7. The power plant according to claim 2, further comprising a source of geothermal steam, and a conduit through which geothermal steam condensate is delivered to a supply of cooling liquid used to condense said organic motive fluid in said first and second condensers.

8. The power plant according to claim 7, wherein the supply of cooling liquid is cooled by a cooling tower.

9. The power plant according to claim 7, wherein geothermal steam condensate from the further preheater is re-injected into a re-injection well.

10. The power plant according to claim 7, further comprising a separator whereby extracted geothermal fluid is separated into a steam portion and into a brine portion.

11. The power plant according to claim 7, wherein said delivered geothermal steam condensate serves as make-up liquid for evaporative cooling liquid.

* * * * *